United States Patent

[11] 3,530,887

| [72] | Inventor | Paul E. Stratman |
| | | Minneapolis, Minnesota |
| [21] | Appl. No. | 686,571 |
| [22] | Filed | Nov. 29, 1967 |
| [45] | Patented | Sept. 29, 1970 |
| [73] | Assignee | Parker-Hannifin Corporation |
| | | Cleveland, Ohio |
| | | a corporation of Ohio |

[54] QUICK DISCONNECT COUPLING
7 Claims, 3 Drawing Figs.

[52] U.S. Cl. ........................................... 137/614.05,
251/210
[51] Int. Cl. ............................................. F16l 37/22,
F16l 37/28
[50] Field of Search .................................. 137/614.04,
614.03, 614.05, 614.06; 251/211, 516.29, 332,
210

[56] References Cited
UNITED STATES PATENTS

| 3,215,161 | 11/1965 | Goodwin | 137/614.04 |
| 3,348,575 | 10/1967 | Simak | 137/614.05 |
| 3,431,942 | 3/1969 | Kopaska | 137/614.05 |

FOREIGN PATENTS

| 1,351,077 | 12/1963 | France | 251/210 |
| 632,025 | 11/1949 | Great Britain | 137/614.04 |

*Primary Examiner*—William F. O'Dea
*Assistant Examiner*—Howard M. Cohn
*Attorney*—John N. Wolfram

ABSTRACT: This invention relates to a valved quick disconnect coupler for fluid lines in which one coupling member is constructed to permit coupling to the other coupling member while both members are under fluid pressure, one of the coupling members having an internal construction permitting minimum overall length of the coupled members and with the internal parts thereof constructed to avoid hydraulic locking and to insure tight closure of the check valve therein when the one coupling member is disconnected from the other.

Patented Sept. 29, 1970

3,530,887

INVENTOR.
PAUL E. STRATMAN
BY John N. Wolfram
ATTORNEY

QUICK DISCONNECT COUPLING

In previous disconnect couplers in which one coupling member has internal parts that permit coupling while both members are under fluid pressure, the construction of the internal parts is such that minimum overall length and adequate venting and sealing of the parts is not obtained. It is an object of the present invention to construct and arrange such internal parts in a manner to overcome these deficiencies.

Figure 1:
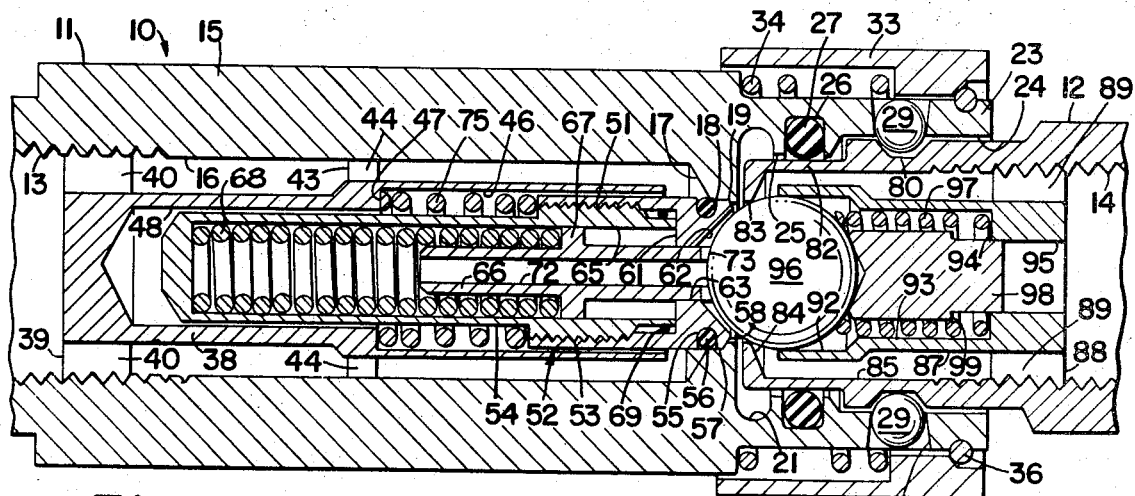
FIG. 1 is a cross section view showing the two coupling members as they appear when they have been coupled while there is pump pressure in one of the members and system pressure in the other member.
Figure 2:
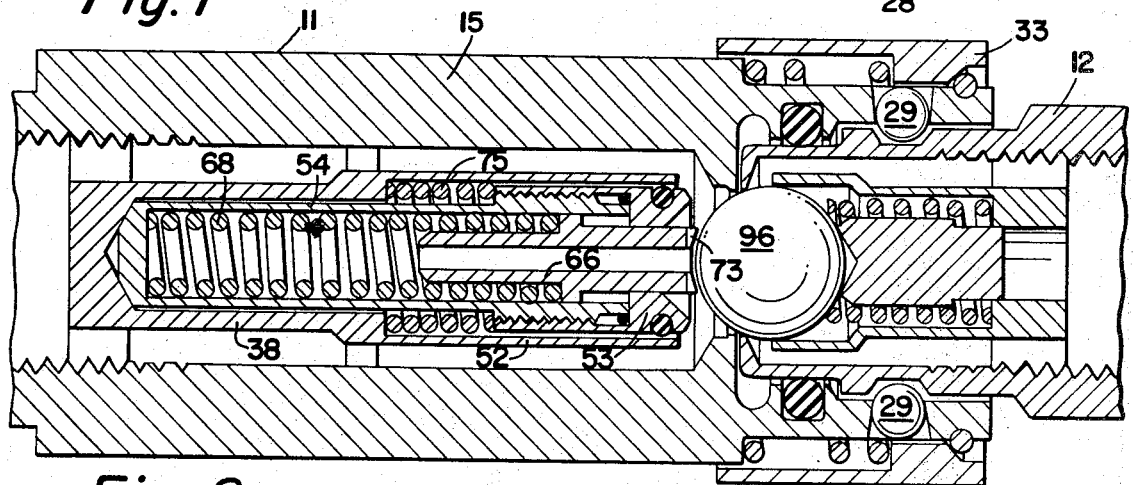
FIG. 2 shows the position of the internal parts when the pump pressure has been momentarily relieved.
Figure 3:
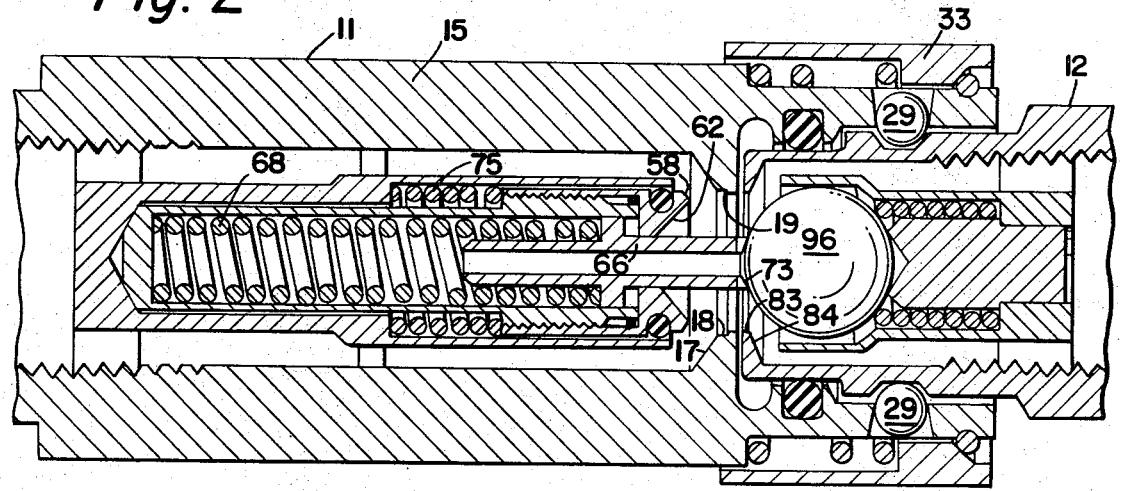
FIG. 3 shows the position of the internal parts when pump pressure has been restored and the check valve in each member is open to permit flow through the coupling.

Coupler 10 includes a socket member 11 and a tip member 12. The socket is connectible to a pump or other pressure source by means of thread 13 and tip 12 is connectible to a hydraulically operated device, as for example a farm implement, by thread 14. Socket 11 has a body 15 with a flow passage bore 16 therein that is stepped down by means of a tapered seat 17 to a bore 18 of lesser diameter that terminates at a valve seat 19. Body 15 also has an extension 23 having a bore 24 and a counterbore 25 that has an annular groove 26 therein that contains an O-ring 27. Extension 23 also has an annular recess 21 and it has a plurality of radially spaced holes 28 that contain detent balls 29. A sleeve 33 is normally pressed outwardly by spring 34 to lock balls 29 in a radially inward position and is retained on extension 23 by a snap ring 36.

Mounted in body 15 is a cup-shaped shield 38 having spider legs 39 at one end that are threadedly engaged with threads 13 and that provide circumferentially spaced fluid passage slots 40 therebetween.

Intermediate the ends of shield 38 are other spider legs 43 having smooth outer surfaces that are segments of a circle and closely fit bore 16 to properly align shield 38 within bore 16. Spider legs 43 provide circumferentially spaced slots 44 providing fluid flow passages. The forward end of shield 38 is spaced from seat 17 and it has a bore 46 terminating in a shoulder 47. Shield 38 also has a counterbore 48 that is closed at its outer end.

Mounted in shield 38 is a check valve 52 that comprises an annular poppet 53 threaded at 51 to a cup 54 closed at its outer end and open at its inner end.

53 has a groove 55 in which is mounted an O-ring 56 that sealingly engages seat 17 when check valve 52 is in closed position. Poppet 53 has a cylindrical portion 57 that is a close sliding fit within bore 18 and it has an outwardly facing tapered surface 58 that engages seat 19. Poppet 53 also has a countersink 62 that at its outer end intersects surface 58 and at its inner end intersects a bore 63. Cup 54 has a bore 65 in which a stem 66 having a flange 67 is slidably mounted with a close fit at the periphery of the flange. A spring 68 engages the closed end of cup 54 and flange 67. A rubber O-ring 69 seals threaded joint 51. Stem 66 has an opening 72 therethrough that connects with a cross slot 73. A spring 75 bears against shoulder 47 and poppet 53 to urge the latter toward closed position.

Tip 12 has an annular groove 80 and a cylindrical extension 82 whose inner end has a bore 83 therethrough and which provides a valve seat 84 adjacent the inner end of a flow passage bore 85.

Tip 12 contains a shield 87 having spider legs 88 threadedly engaged with threads 14 and providing circumferentially spaced flow slots 89.

The inner end of shield 87 is spaced from tapered seat 84 and has consecutively a bore 92, a reduced bore 93, a shoulder 94, and a further reduced bore 95.

Within bore 92 is a check valve ball 96 that is normally pressed by spring 97 against seat 84. A plunger 98 is slidable within bores 93, 95 and has a shoulder 99 engageable with shoulder 94.

OPERATION

When coupling members 11 and 12 are not connected to each other the parts within shields 38 and 87 are in the positions illustrated in FIG. 1 except that stem 66 is pressed by spring 68 to a position in which flange 67 engages poppet shoulder 61.

To couple the parts, sleeve 33 is retracted against pressure of spring 34 to permit balls 29 to move radially outwardly. Tip 12 is then inserted to the position shown in FIG. 1 and sleeve 33 is released to lock balls 29 into groove 80 and with O-ring 27 in sealing contact with extension 82.

During such coupling action, if socket member 11 is under pump pressure and tip 12 contains trapped system fluid under high pressure, poppet 53 will be in closed position against seat 19 with O-ring 56 engaging seat 17 and ball 96 will be in closed position against seat 84. Ball 96 engages the outer end of stem 66 during the coupling action and moves the latter to the position shown in FIG. 1 against the pressure of spring 68.

As stem 66 moves into cup 54 it displaces oil therefrom through opening 72, slot 73 and past the clearance between ball 96 and poppet face 62 to recess 21 to prevent hydraulic locking of stem 66.

Spring 68 is stronger than spring 75 but exerts less force than the combined force of spring 75 and high fluid pressure within shield 38 tending to move check valve 52 toward seat 19.

During the coupling action, check valve 96 is held against its seat by the action of spring 97 and pressure of fluid within tip 12. Likewise, poppet 53 is held against its seat by the action of spring 75 and the high pressure of fluid within body 11 that has gained access to the interior of shield 38 between the front end of the shield and poppet 53 and which fluid presses on the exterior of cup 54 to urge the cup and poppet toward seat 19.

After coupling of the members when both are under pressure has been completed, the pump pressure is momentarily relieved by the operator, as by operating a directional control valve (not shown) adjacent the pump to drop the pressure within body 15. This releases the pressure of the fluid within shield 38 acting upon check valve 52 to seat poppet 53 against seat 19 and now spring 68, being stronger than spring 75 moves check valve 52 to the left for unseating poppet 53 from seat 19. As poppet 53 moves toward open position and the forward portion of the poppet disengages from seat 19 and O-ring 56 disengages from seat 17; the close fit between cylindrical portion 57 and bore 18 substantially prevents flow of fluid between these parts so that appreciable flow is not initiated until portion 57 is withdrawn from bore 18. At this time O-ring 56 is a considerable distance from seat 17 whereby there will be no high velocity fluid flow over O-ring 53 that might otherwise dislodge it. Moreover, the forward end portion 58 of poppet 53, being conical directs initial flow, which will be at high velocity, along conical surface 17 to further protect O-ring 56 against dislodgment by fluid flow. When poppet 53 is in its full open position O-ring 56 enters the forward end of shield 38 but with a clearance therewith to avoid hydraulic locking of check valve 52 in its open position. Shield 38, although not normally in contact with O-ring 56, will restrain the latter in the event fluid tries to displace it from its groove.

After such momentary dropping of pressure in body 15 and the opening of check valve 52, pressure is restored to the fluid in body 15 and it acts upon ball 96 to unseat the latter against pressure of fluid within tip 12 and thus fluid flow is established between the two coupling members. Opening movement of ball 96 is limited by its contact with plunger 98 which in turn is limited in its movement by engagement of shoulder 99 with shoulder 94. During opening movement of ball 96, stem 66 will move in the same direction and remain in contact with ball 96 by action of spring 68. Spring 68 in its fully extended position has enough force to maintain springs 75 and 97 compressed so as to maintain both poppet 53 and ball 96 in their open positions not only when fluid is static within the coupling but also when it is flowing in either direction.

If the coupling members 11 and 12 are now disconnected from each other by retraction of sleeve 33 for releasing balls 29 from groove 80, spring 97, with or without assistance of fluid pressure within tip 12, will close ball 96 against its seat. Likewise, spring 75, either with or without assistance of fluid pressure within shield 38, will move check valve 52 to its closed position.

As check valve 52 closes, poppet cylindrical portion 57 enters bore 18 to substantially stop flow of fluid therebetween so that there is substantially no flow of fluid between O-ring 56 and seat 17 as O-ring 56 approaches the latter and seats thereon and therefore there is substantially no fluid velocity pressure tending to dislodge O-ring 56 from its groove 55. Shortly after O-ring 56 engages seat 17, poppet 53 engages seat 17. Fluid pressure within body 15 helps to seat O-ring 56 against seat 17 and such seating serves as a positive seal so that there will be no leakage even if poppet 53 does not seal absolutely tight against seat 19.

If there is no fluid pressure within body 15 when member 11 is coupled to member 12, ball 96 initially engages stem 66 and moves it to the left tending to compress spring 68. However, because the latter is stronger than spring 75 the latter will compress instead and check valve 52 will move to open position. If at this time there is fluid pressure in tip 12 ball 96 remain seated until fluid pressure is applied to body 15 to cause ball 96 to open. Once open, fluid pressure becomes substantially balanced on opposite sides thereof and strong spring 68 maintains ball 96 open against pressure of spring 97.

If there is no fluid pressure in tip 12 during coupling, strong spring 68, acting through stem 66, will open ball 96 against the closing force of spring 97.

I claim:

1. A quick coupling comprising a pair of coupling members having flow passages therethrough, each member having a valve seat and a spring seated check valve, each check valve having a seating surface engageable with a respective one of said valve seats for closing the respective flow passage, means coupling the members to each other, biasing means between the check valves exerting a force on each check valve tending to open the same when the members are coupled, one of said check valves having a recess radially opposite the seating surface of said one check valve, said recess receiving a portion of the other check valve when both check valves are closed to thereby minimize the overall length of the coupling. and a clearance between the check valves when the members are coupled and the check valves are closed.

2. The coupling of claim 1 in which said one check valve has a chamber containing said biasing means and said biasing means has a portion extending from the chamber into said recess and into engagement with said other check valve when the members are coupled.

3. A quick coupling comprising a pair of coupling members having flow passages therethrough, each member having a spring seated check valve therein for opening and closing the respective flow passage, means coupling the members to each other, one of said check valves being hollow with a closed end and an open end and containing a stem movable therein and extendable through said open end and having an abutment surface engaged with the other check valve, spring means engaging said closed end and a rear face of the stem and urging the stem against the other of said check valves whereby the latter is urged toward its open position, said spring means also urging the hollow check valve toward its open position, said spring means exerting greater force than the spring for either check valve, said check valves when closed having a clearance therebetween, said stem having an opening therethrough communicating said rear face with said clearance.

4. A valved coupling member, comprising a body having means thereon for connection to another coupling member, said body having a flow passage therethrough, a valve seat surrounding the passage at one end thereof, a cup-shaped shield within the passage and fixed to the body, a first spider portion located at the closed end of the shield locating said closed end radially within said passage, said shield having its open end facing said seat, said shield having a greater clearance with the wall of said passage adjacent the spider portion than adjacent said open end, a check valve within the shield having a surface engageable with said seat for closing said passage, said check valve having a bore therein open at one end and closed at its other end, a stem within the check valve bore and having a portion extendable therefrom, a first spring between the cup-shaped member and the check valve urging the latter toward closed position against said seat, a second spring stronger than the first spring between a rear face of said stem and the closed end of the check valve and urging the stem toward extended position, said stem having an opening therethrough for venting said rear face to the exterior of the check valve.

5. The coupling member of claim 4 in which said shield has a second spider toward said open end and engaging said passage wall to radially locate said open end within said passage.

6. A valved coupling member comprising a body having means thereon for connection to another coupling member, said body having a flow passage therethrough, a valve seat surrounding the passage at one end thereof, a cup-shaped shield within the passage and fixed to the body and with its open end facing said seat, a check valve within the shield having a surface engageable with said seat for closing said passage, said check valve having a bore therein open at one end and closed at its other end, a stem within the check valve bore and having a portion extendable therefrom, a first spring between the cup-shaped member and the check valve urging the latter toward closed position against said seat, a second spring stronger than the first spring between said stem and the closed end of the check valve and urging the stem toward extended position, said shield having a larger bore at its open end and a smaller bore toward its closed end and a transverse shoulder between said larger and smaller bores, said check valve having larger and smaller cylindrical portions respectively received in said larger and smaller bores with a sliding fit and said cylindrical portions having a transverse shoulder therebetween, and said first spring being engaged with both said shoulders.

7. The coupling member of claim 6 in which said check valve comprises a poppet member connected to a closure member and there is a means for sealing said connection.